(12) United States Patent
Furcht et al.

(10) Patent No.: US 6,303,288 B1
(45) Date of Patent: Oct. 16, 2001

(54) INTEGRATED MICROCHIP GENETIC TESTING SYSTEM

(75) Inventors: Leo T. Furcht, Minneapolis; Ronald C. McGlennen, Edina; Dennis L. Polla, Brooklyn Park, all of MN (US)

(73) Assignee: Regents of the University of Minnesota, Minneapolis, MN (US)

(*) Notice: Subject to any disclaimer, the term of this patent is extended or adjusted under 35 U.S.C. 154(b) by 0 days.

(21) Appl. No.: 09/499,202

(22) Filed: Feb. 7, 2000

Related U.S. Application Data

(63) Continuation of application No. 09/045,873, filed on Mar. 23, 1998, now Pat. No. 6,054,277, which is a continuation-in-part of application No. 08/848,420, filed on May 8, 1997, now abandoned.
(60) Provisional application No. 60/017,081, filed on May 8, 1996.

(51) Int. Cl.[7] .................................................. C12Q 1/00
(52) U.S. Cl. ................ 435/4; 435/6; 435/287.2; 435/287.3; 435/287.6; 435/287.7; 435/970; 422/56; 422/61; 935/77; 935/78; 935/87
(58) Field of Search .................... 435/4, 6, 287.2, 435/287.3, 287.6, 287.7, 287.8, 810, 970; 422/56, 61; 935/77, 78, 87

(56) References Cited

U.S. PATENT DOCUMENTS

| | | | |
|---|---|---|---|
| 4,789,804 | * | 12/1988 | Karube et al. .................. 310/311 |
| 5,037,764 | * | 8/1991 | Wilk et al. ...................... 436/518 |
| 5,376,252 | * | 12/1994 | Ekstrom et al. ................ 204/299 R |
| 5,536,953 | * | 7/1996 | Polla .............................. 257/417 |
| 5,587,128 | * | 12/1996 | Wildings et al. ................ 422/50 |
| 5,589,136 | * | 12/1996 | Northrup et al. ............... 422/102 |
| 5,597,532 | * | 1/1997 | Connolly ........................ 422/58 |
| 5,632,957 | * | 5/1997 | Heller et al. ................... 422/68.1 |
| 5,635,403 | * | 6/1997 | Bailey ............................ 436/66 |
| 5,652,149 | * | 7/1997 | Mileaf et al. .................. 436/518 |
| 5,856,174 | * | 1/1999 | Lipshutz et al. ............... 435/286.5 |
| 6,187,598 | * | 2/2001 | May et al. ...................... 436/514 |

FOREIGN PATENT DOCUMENTS

WO-9405414 * 3/1994 (WO).
WO-9702357 * 1/1997 (WO).
WO-9712063 * 4/1997 (WO).

OTHER PUBLICATIONS

Mark A. Burns et al., "Microfabricated structure for integrated DNA Analysis," Proceedings of the National Academy of Sciences of USA, Vol.93, May 1996, pp.5556–5561.*

* cited by examiner

*Primary Examiner*—David A. Redding
(74) *Attorney, Agent, or Firm*—Schwegman, Lundberg, Woessner & Kluth, P.A.

(57) ABSTRACT

A genetic testing system includes a miniaturized thermal cycling device and an integrated, unitary microchip based detection device with microfluidic controls, on chip electronics. The genetic testing system further uses dipped or coated polymeric materials on processed silicon as a means to facilitate amplification chemistry.

15 Claims, 8 Drawing Sheets

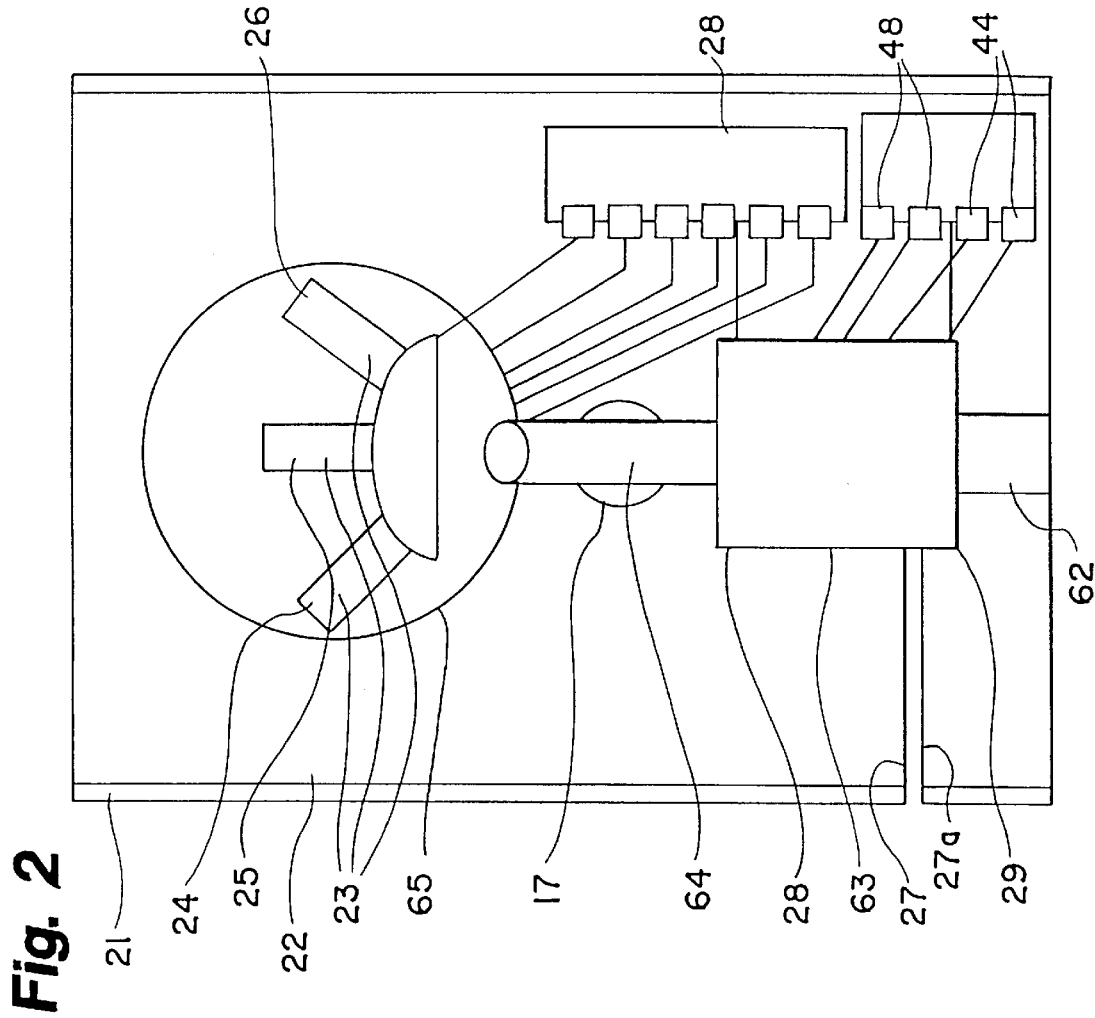

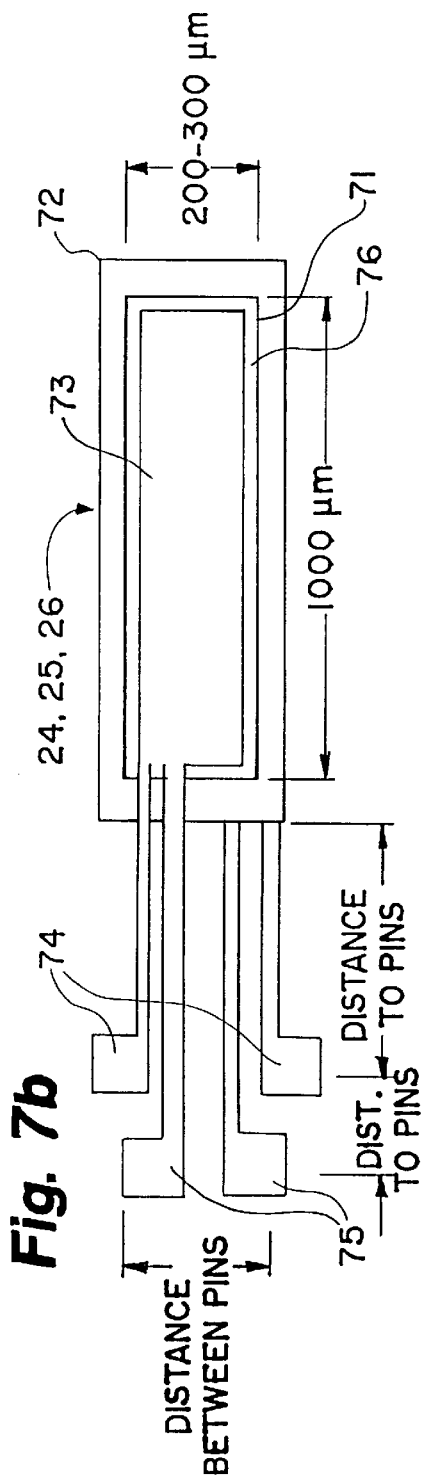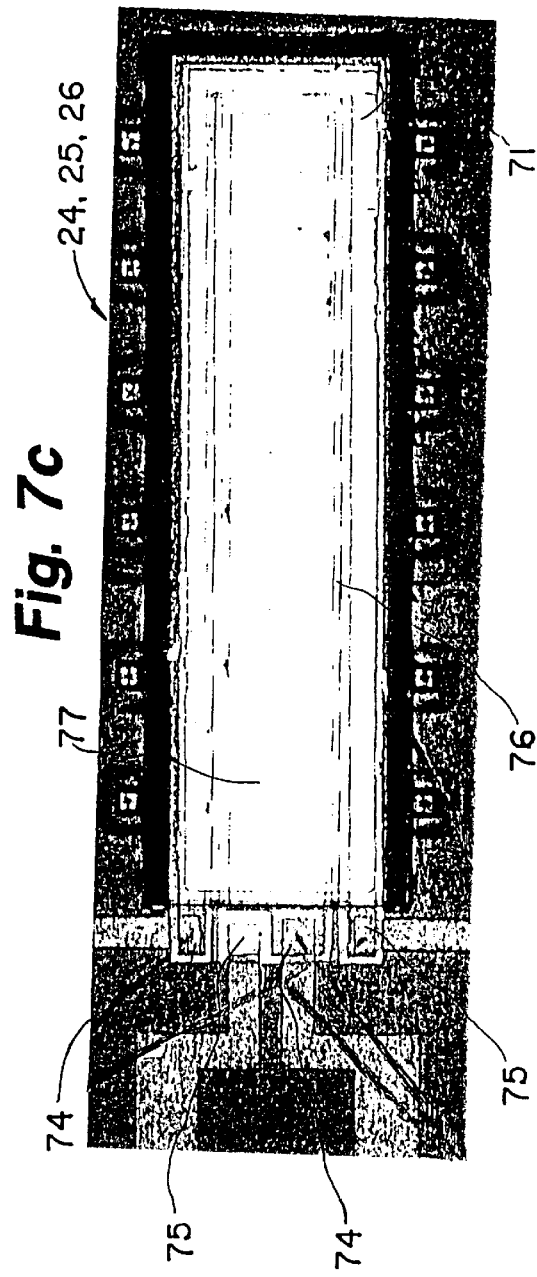
Fig. 7b
Fig. 7c

INTEGRATED MICROCHIP GENETIC TESTING SYSTEM

RELATED APPLICATIONS

The present application is a continuation of U.S. patent application Ser. No. 09/045,873 filed Mar. 23, 1998 now U.S. Pat. No. 6,054,277, which is a continuation-in-part of U.S. patent application Ser. No. 08/848,420 filed May 8, 1997, now abandoned, and which claims the benefit of U.S. Provisional Application No. 60/017,081, filed May 8, 1996.

TECHNICAL FIELD

The present invention relates to a device and a method for performing molecular diagnostics. More particularly, the present invention relates to molecular testing on an integrated circuit.

BACKGROUND OF THE INVENTION

The identification of disease causing mutations and the genetic characterization of infectious agents has resulted in the ability to diagnose genetic (including congenital and acquired and infectious) diseases at the molecular level. Molecular diagnostic methods, however, remain time and labor intensive, thus limiting the use and availability of routine molecular testing for patient care. "DNA testing on a chip" (i.e., the use of microchip technology for molecular diagnostics) has recently been touted as the solution to the high cost of molecular-based testing. The design, fabrication processing and use of an integrated microchip based genetic testing system is described. The invention described combines unique designs for several components including a nucleic acid amplifier microchip and separate detector device fabricated onto a silicon substrate and integrated through the use of polymeric materials defining the respective spacing elements, fluid reservoirs and transport channels as well as serving as a packaging material to house the complete unit and its controlling electronic circuitry.

Advances in molecular genetics, derived principally from the human genome project, promise to revolutionize health care in the 21st century. These advances recognize that most human disease is a consequence of variations in the structure of DNA, whether through deleterious mutations or due to a simple difference in the sequence of DNA that predispose to disease. These observations point to the fact that molecular genetic testing is a likely final common pathway to all medical diagnoses. For this reason, one focus in health care, and for biomedical research in the near and long term future will be to develop more advanced systems for molecular genetic based diagnostic testing.

Presently, molecular diagnostic laboratories are in their early stages of evolution. Typically these facilities exist only in large hospitals or academic medical centers, where the service offered focuses on providing a handful of tests for selected disease states. With the advent of the polymerase chain reaction, PCR, a method to amplify a precise fragment of DNA to quantities which can be easily evaluated, there has been a major improvement in the feasibility of performing routine molecular genetic testing. Consequently, PCR has become the primary biochemical technique used in molecular genetic laboratories. Although PCR, and other amplification techniques are highly specific and sensitive, they are still highly labor intensive and consequently very costly.

Thus, despite the importance of molecular genetic testing to improve patient: care, the growth of this discipline is being challenged by the mandate of the health care market to fundamentally reduce the cost of genetic testing. So great are the expectations to contain costs, that given the present state of technology and automation in these laboratories, the promises of molecular genetics for patient care will not be realized because these forms of "esoteric" testing will be unaffordable.

Several factors contribute to the high cost clinical molecular genetic testing. Although microchip technology is being developed for several specific applications in the molecular genetic research laboratory, the utility of this technology for the purpose of testing has not been realized. Introduction of this technology into the clinical laboratory will dramatically decrease the cost and labor associated with molecular diagnostics, thereby increasing the availability and potential clinical applications for genetic testing. How molecular genetic testing is presently being performed, and the opportunities to improve it based on microelectromechanical (MEMs) technology is being evaluated by several research groups throughout the world.

However, based on the current methods of performing molecular genetic testing and the costs associated with each operational step, the most significant costs are the so-called front-end which include specimen procurement and nucleic acid extraction. Specifically, collection of blood from the patient is an invasive procedure which requires a trained medical technician. Large specimen sizes are convenient for manual processing, but necessitate large scale nucleic acid extractions which use costly reagents. Although first generation automated DNA extractors have been available, these instruments use large quantities of toxic chemicals and are not applicable to small specimens. Similarly, the test set-up, namely the assembly of the chemical reactions involved in the DNA amplification procedure, are typically done manually. Only recently have first generation robotics systems been commercialized, which are predicted to reduce the cost of labor and may also eliminate errors and increase throughput.

Of equal importance to the labor costs, however, are the costs of the reagent used in DNA amplification based chemistry. In this regard, reduction to a microscale reaction volume, such as that conceived with a microfabricated version of a thermal controlled DNA amplifier would have overall a significant impact on the reduction of the cost of genetic testing.

One solution to the problem of sample procurement and DNA extraction is the replacement of DNA in solution to one where it is enmeshed in a solid support system, such a paper. The use of FTA™ coated paper (a product of Fitzco, Inc. of Minneapolis, Minn.) for blood stains and other tissue sources works in this manner. In extensive comparative analyses with conventional DNA extractions, DNA extractions on FTA™ paper have demonstrated significant ease in use and reduced cost in performing routine clinical molecular genetic testing. Phased efforts to use the paper-based FTA in the form of a genetic test collection kit are underway, but no such efforts are directed toward a microchip application of this material.

Exploitation of silicon as a substrate for micromachined devices is well established in the engineering fields. Microelectromechanical systems (MEMS) refers to the output of microfabricated devices including those for uses ranging from automotive parts to the airline industry. MEMS have a particular usefulness in biological applications due to their requirement for small sample sizes, low energy, and nominal forces. The increased efficiency of MEMS-based instruments, however, has yet to be realized commercially in biomedical applications, where the need for economy in manufacture, ease of operation, reduction of consumables and the mobilization of the laboratory operation to point-of-care testing are evident. While the future looks promising for the continued development of MEMS for biomedical applications, especially for the clinical chemistry, relatively little research has been applied to the field of molecular genetics utilizing MEMS technology.

Development of chip based technologies for testing DNA has focused primarily in two areas: one on a miniaturized thermal cycling device, and the second on a variety of chip based detection methods. To date, however, no successful integration of these components along with microfluidic controls, on chip electronics and attempts at small and portable controlling mechanism(s) have been achieved.

Considerable work in the area of a microchip based thermocycling device has been described. The initial research was based on the use of a simple heater chip held in a block type apparatus which clamped the chip to a plastic or metal reservoir. The microchips themselves have been fabricated from glass or combinations of silicon bonded to glass by anodic or silicone rubber fixation. Amplification of DNA or RNA based templates has been achieved using on-chip polysilicon thin film heaters, or externally by means of a Peltier heater-cooler. Moreover, in these cases, nucleic acid amplification was accomplished using the polymerase chain reaction, ligase chain reaction and even isothermal enzyme based amplifications.

Using chip-based devices, there has been research into what combination of materials are compatible with the enzyme-based reactions. In general, standard materials common to the silicon processing industry have been explored including thermal deposition of silicon oxide. Preliminary work has also shown how conventional plastics such as polyethylene and polypropylene can be used to "passivate" the silicon chip surface. To date, however, no work is known that outlines the use of dipped or coated polymeric materials on processed silicon as a means to facilitate the amplification chemistry.

Work on chip based detectors is more established with most efforts focused on the use of fluorescent based optical material. Early research by Fedor et. al. established that silicon could serve as a substrate onto which organic molecules such as DNA could be synthesized. The process, now commercialized by Affymetrix Inc. of Santa Clara, Calif., involves the use of serial photolithographic steps to build oligonucleotides in situ at a specific addressable position on the chip. The strategy of addressing specific nucleic acid sequences synthesized off-chip, then hybridized to a particular location on a chip by electrical attraction to a charged microelectrode has been developed by Nanogen Inc. Variation on the theme of microaddressable arrays has recently led to the evaluation of chips for sequence analysis of uncharacterized genetic material, mutational analysis of a known gene locus, and for the evaluation of a particular cell or tissue's profile of gene expression for the whole complement of the human DNA sequence. However, in each case, these methodologies rely on the use of laser activated fluorescence of addressable signals on a microchip.

Another approach to micromachined based detection systems involves the use of capillary electrophoresis. In this case, MEMS-based processing of silicon, glass and plastic has been employed to create microchannels, capillaries and reservoirs in which samples of fluid containing large molecular weight as well as small sized, amplified DNA fragments which are electrophoresed in the presence of an applied voltage. This strategy has been commercialized by companies such as Soane and Caliper Technologies Inc. Recently, Cephiad Inc. has adopted a similar approach to combine a microchip based thermocycler with capillary electrophoresis in a single unit. Such devices have demonstrated high resolution of DNA fragments of molecular weights ranging from 60–2000 base pairs in time superior to macroscale capillary electrophoresis instruments. In all cases, the performance of the various detection systems is comparable, and in many cases better than that of conventional agarose and polyacrylamide gel electrophoresis. However, no experience of the use of a MEMS-based device which employs transduction of a mechanical based signal to an electronic readout has been disclosed.

SUMMARY OF THE INVENTION

The present invention is a miniaturized thermal cycling device and an integrated, unitary microchip based detection device with microfluidic controls, on chip electronics. Further, the present invention uses dipped or coated polymeric materials on processed silicon as a means to facilitate amplification chemistry. The invention relates to fabrication, assemblage and general application and operation of an integrated microchip genetic testing system. The components of the invention include the silicon based substrate(s) onto which is fabricated a thermocycling resistive heater and thermosensing element, a nucleic acid detection sensor based on a piezoelectrically actuated and sensing microcantilever device, the on wafer electronic circuitry to amplify the output signal from the detection sensor, the interposed microfluidic chambers and interconnecting capillaries, the integration of these components through means of microfabrication based processes, the operation of the assembled device involving the dispensing of nucleic acid sample and biochemical reactants into the chip based system and functioning of the system through an accompanied software module with "smart readout" display. The invention further relates to the unique compilation of molecular genetic testing hardware and systemic approach toward diagnostic and research based genetic testing algorithms. The present invention is a MEMS-based device which employs transduction of a mechanical based signal to an electronic readout. The complete genetic testing system of two MEMS-based microchips and complementary integrated charge signal amplifier circuit fabricated onto a single silicon wafer and encapsulated in a platform comprising two reservoirs in which the respective operations of nucleic amplification based thermal cycling and detection of the amplification products is achieved. The system is packaged such that the silicon wafers are bonded in apposition, one of which contains the nucleic acid amplifier, the microcantilever detector and the IC preamplifier, and the second, only a nucleic acid amplifier chip. The two silicon wafers are bonded together in precise alignment with a cured polymeric material, which defines the reservoir cavities, the interconnecting capillary, and the surface to which each silicon wafer is bonded. The result is a sealed and integrated device which contains two access ports used in the operation of the system.

The first access port, an in-port, is a round or slit like space used for the insertion of a nucleic acid sample device into the nucleic acid amplifier chamber. This is used by inserting the FTA-matrix collection device into the slit, which contains the nucleic acid sample and the associated amplification reagent in solution, and simultaneously seals the chamber. The second access port contains the wire components of the thermosensing device and the electrical interconnects to the various electronic components and the MEMS chip devices.

The nucleic acid amplifying chamber is constructed from the apposition of two heater chips, fabricated from silicon and using processes common to the integrated circuit technology industry. Two silicon wafers are bonded together via an interposed polymeric layer which also forms the side walls of the heating and detecting chambers as well as the fluidic interconnects. The dimensions of the nucleic acid amplifying chamber can varying, but are optimized to contain between 5 and 50 $\mu L$ of reaction volume. The heater chips are fabricated from a silicon substrate through processes involving microphotolithography of the heater filaments, deposition of a conductive metal and patterned removal of a conductive metal to create a serpentine or coil filament of known electrical resistance. Electrical bonding pads are positioned outside of the space defined by the chamber, which in turn are attached to a voltage/power source. The surface of the heater chip is passivated by a process involving the serial coating and curing of heat resistant and biocompatible polymer such as octadecyl-trichlorosilane (OTS).

Thermosensing is achieved by the fabrication of a miniaturized thermoresistive sensor within the sidewall of the polymeric material, or directly on the heater chip, with the sensing portion of the sensor in contact with the reaction fluid. The design of the present invention permits the insertion of a strip or probe based device which contains the sample of processed nucleic acid, premixed amplification reaction cocktail solution volume and a gasket to seal the chamber with allowances for the thermal expansion and contraction of the chamber when a power source is applied.

The detector chip, described as a component of this invention, incorporates a previously described microcantilever biosensor constructed in a unit of three individual devices and fabricated on the same piece of silicon as includes the heater chip and charge amplifier circuit. The microcantilever sensors are grouped to create a system with an internal reference sensor, a relevant negative control sensor, and a third sensor dedicated to the detection of a specific and prescribed analyte (test sensor). Each microcantilever sensing device is comprised of a thin microbeam structure (approximately 1.5 $\mu m$) laminated with the following elements: a bottom electrode comprised of a platinum conductor, an adhesive layer constructed from a composite of metals such as platinum/titanium underlying a lead zirconium titanate (PZT) actuating layer, and an electrically isolated PZT based sensing layer, a top electrode constructed similar to the bottom electrode, and a molecular recognition layer consisting of gold and a titanium adhesive interface.

The molecular recognition layer involves the specific deposition of a actuating polymeric surface into which the receptor or capture biomolecules are incorporated or attached. The sensors (reference, negative control and test) function by mechanically vibrating at their known resonant frequency, driven through the alternating polarization of the actuating PZT layer powered by an outside voltage source. With the specific binding of the prescribed analyte to the molecular recognition surface, the effective mass loading of the resonant microbeam structure is altered, typically resulting in a lower resonant frequency, and one proportional to the mass of the binding analyte. This binding event also leads to the creation of a compressive stress that is mediated through the conformational shape change of the actuating polymer. The combination of the actuating polymer and the effective mass loading onto the molecular recognition surface results in a highly sensitive signal transduction path which results in the production of charge from the resulting deformation of the sensing piezoelectric element, and well as a shift in the mechanical resonant frequency.

The present invention also includes an integrated charge amplifier as a component of the detection sensors. This component serves to augment the charge exiting the piezoelectric sensing elements before it is analyzed by the system associated software. The controlling software is another component of the integrated system, consisting of the commercial product LabView™, adapted to monitor and control the thermocycling chips at the prescribed temperatures elevations and decreases and the timing of the isothermal plateaus. A second function of the control software is the introduction of the amplification reaction fluid into the interconnecting capillary and passive transport into the detector sensor chamber. A third phase of the control software is the readout display and interpretation of the binding/detection event derived from the shift in resonance from the microbeam structures.

The integrated microchip based genetic testing system is packaged by means of using a high-aspect-ratio, ultrathick, negative-tone near-ultraviolet photoresist to embed the electronic components and create three dimensional walls and capillaries around the heater and detector chips. A compound such as Epon SU-8 is applied to the silicon wafer substrate and deposited by spin coating. Following this, the precise patterning of the various chambers and interconnecting capillaries such as the nucleic amplifier chamber, and the detection chamber are exposed, and then resolved leading to dissolution of the nonexposed material. This approach toward the creation of reservoir and microchannels in turn permits the coincident fabrication of MEMS-based structures, uniquely applied in the present invention to molecular genetic based testing devices.

The silicon wafer containing the heater chip and detector chip also contains the capillary interconnect. The wafer is bonded to a second wafer containing another heater chip through a process involving microalignment of the partially cured polymer interface. The resulting device (the genetic card) is consequently air and water tight sealed, with the resulting two access ports. On one end of the device is placed a series of appropriate electrical interconnects (pins and sockets) which serve to connect to a modified PCMCIA card. The PCMCIA card is primarily a high speed data acquisition interface, but also functions as a holder for the genetic card, providing additional opposing force against the genetic card when the heat and pressure created in the nucleic acid amplifier chamber increase due to heating. In turn the genetic test card and the modified PCMCIA card insert into a standard type II or type III PCMCIA slot in a portable computer, where the data acquisition circuitry interfaces with a modified controller software.

In summary, genetic testing with the integrated microchip based genetic testing system is achieved by use of the genestrip collection device employing the solid support nucleic acid capture membrane, which is inserted into the genetic test card through the sample access port. A specific sequence of nucleic acid impregnated on the genestrip is amplified by means of repeated heating and cooling provided by the opposing heater chips in a solution contained within the amplifying chamber. When the thermal cycling phase of the test is complete, the fluid in the chamber is transport by capillary transport into the detection chamber.

Binding of the specific DNA product derived from the amplifying chamber to the microcantilever molecular recognition surface leads to a mass loading effect on the structure which transduces a change in force through the piezoelectric sensing element and received by the associated signal charge amplifier. This event, transmitted through the systems data acquisition and controlling software, is measured and calculated against the appropriate negative and neutral control sensors and displayed on the computer screen as a positive or negative test result.

BRIEF DESCRIPTION OF THE DRAWINGS

FIG. 2 is an enlarged planview of the reaction chamber of the genetic test card of FIG. 1.

Figures 6B, 6C, 7A:
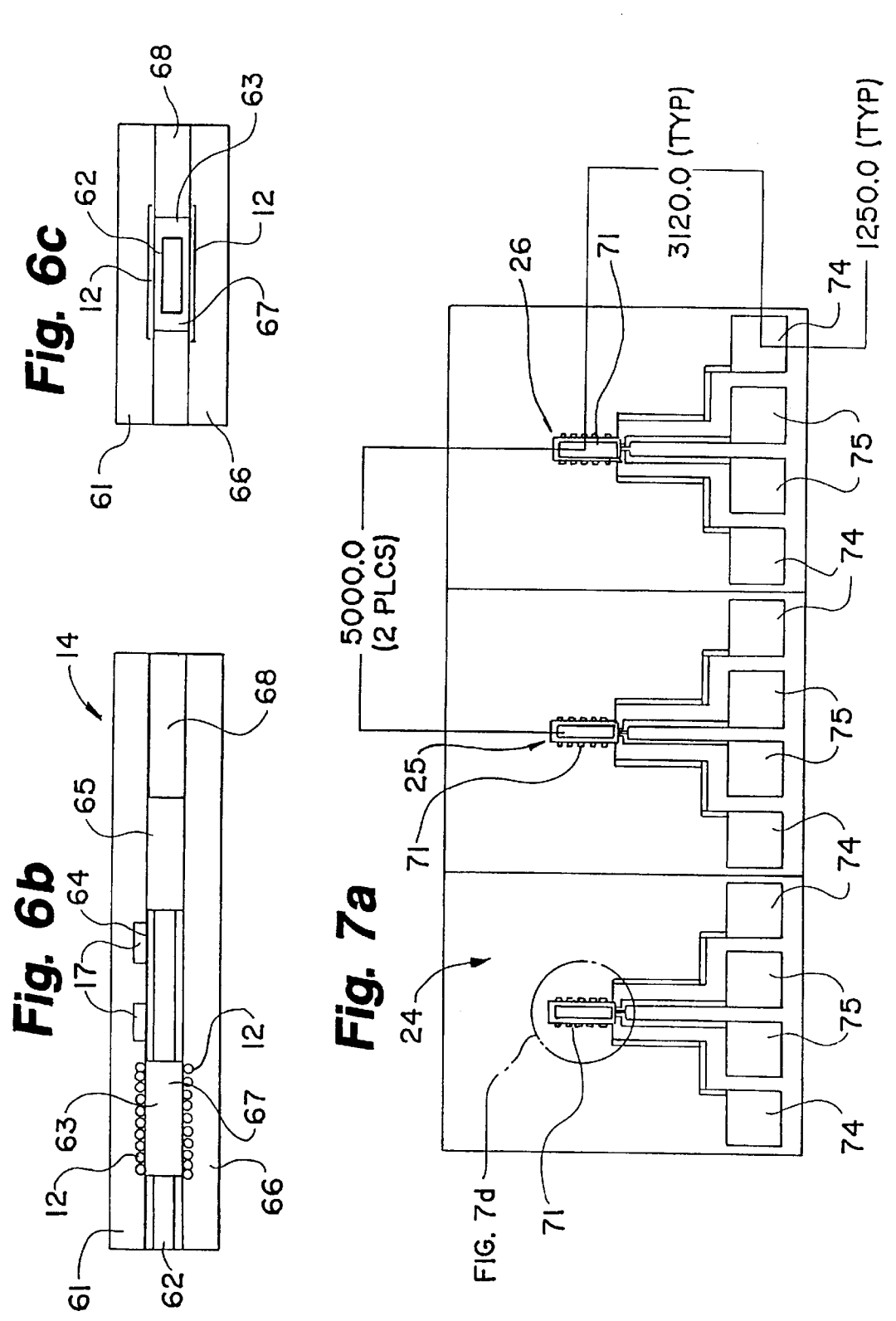

FIG. 6b is a sectional view of the genetic test card taken along line 6b—6b of FIG. 6a.

FIG. 6c is a sectional view of the genetic test card taken along line 6c—6c of FIG. 6a.

FIG. 7a is a top plan view of the array of the three sensor beams of the present invention.

FIG. 7b is a schematic planform representation of the sensor beam.

FIG. 7c is a planform pictograph of the microcantilever detector chip comprising the sensor beam.

FIG. 7d is a plan view of the sensor beam depicted in the circle 7c of FIG. 7a.

FIG. 8b is a graph of the voltage output of a sensing event of the sensor of FIG. 8a.

FIG. 8c is a graph of the frequency shift of the sensor that occurs as a result of a sensing event of the sensor of FIG. 8a.

DETAILED DESCRIPTION OF THE DRAWINGS

Figure 1:
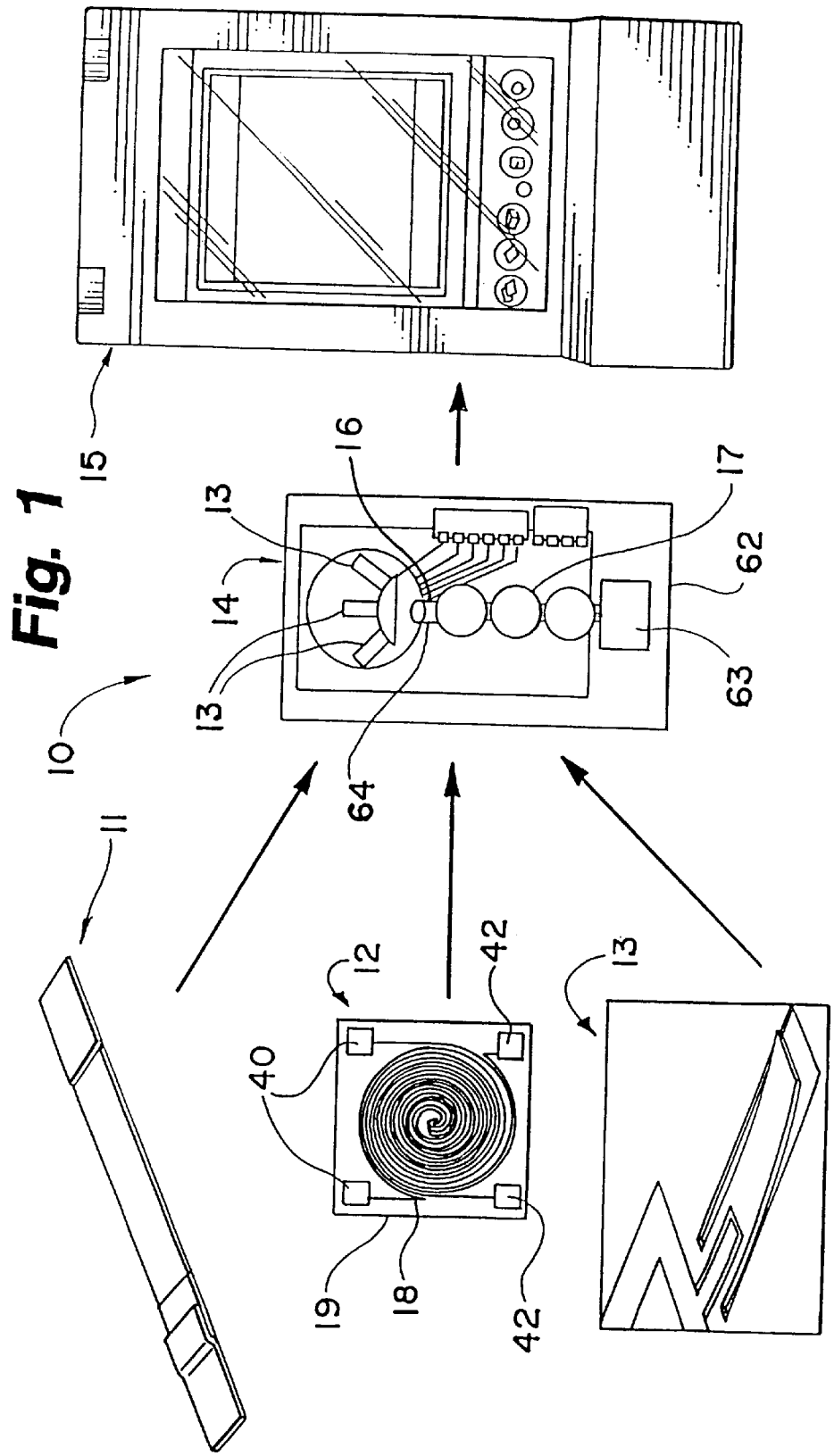
FIG. 1 is a plan view of the major components of the Integrated Genetic Testing System of the present invention.

A. Overview of the Complete Integrated Genetic Testing System, Generally at 10, as Depicted in FIG. 1:

The integrated genetic testing system 10 employs a unique specimen procurement device called the genestrip 11 and a glass slide sized package, the gene test card 14. The gene test card 14 is comprised of the individual microchip components, including heater chip 12 and micro cantilever sensing chip 13, as well as integrated circuit electronic control device and the interfaced capillary fluidic channels 16. A preferred embodiment has three microcantilever sensing chips 13. A plurality of pumps 17 are fluidly coupled to the transport capillary 64 in order to transport material through the channels 16. The pumps 17 are made according to U.S. Pat. No. 5,466,932, incorporated herein by reference. The pumps 17 are piezoelectric actuated and pump by peristaltic action.

Figure 9:
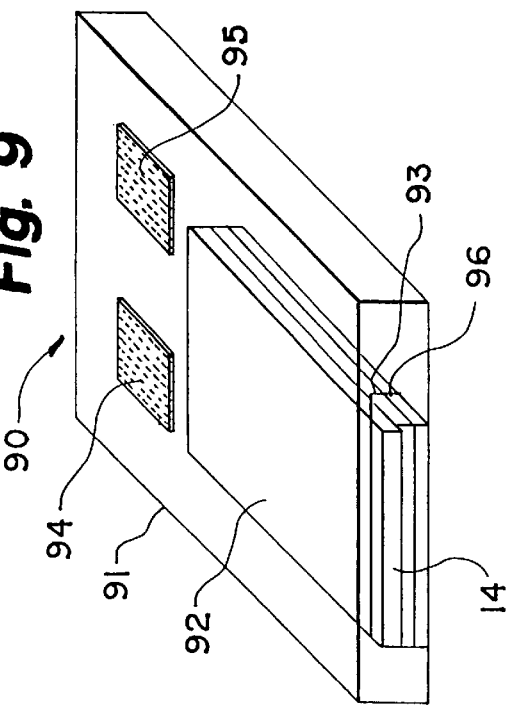
FIG. 9 is a perspective schematic diagram of the genetic test card inserted into the PCMCIA controller card.

The integrated system 10 is designed to be inserted into a modified PCMCIA card 91, depicted in FIG. 9, comprising in combination a gene test card processor 90. The gene test card processor 90 functions through a direct electrical connection with the modified PCMCIA card 91. The modified PCMCIA card 91 has a standard card slot 92 for insertion of the gene test card 14 therein. A reinforced gasket seal 93, sealing the interface of the gene test card 14 and the modified card slot 92 is provided at the input port 96 to the card slot 92. Two electrodes are provided on the upper surface of the modified PCMCIA card 91, a data acquisition chip interface 94 and an input power regulator and function generator for detector chips 95.

The modified PCMCIA card 91 in turn interfaces into the card slot (not shown) of a personal computer or palm-top personal digital assistant type device 15 (depicted in FIG. 1) by means of the data acquisition chip interface 94 and the input power regulator and function generator for detector chips 95. The computer 15 is equipped with a specifically modified software module that provides the electronic control, data interface and readout display from the respective components of the system 10.

Figure 3:
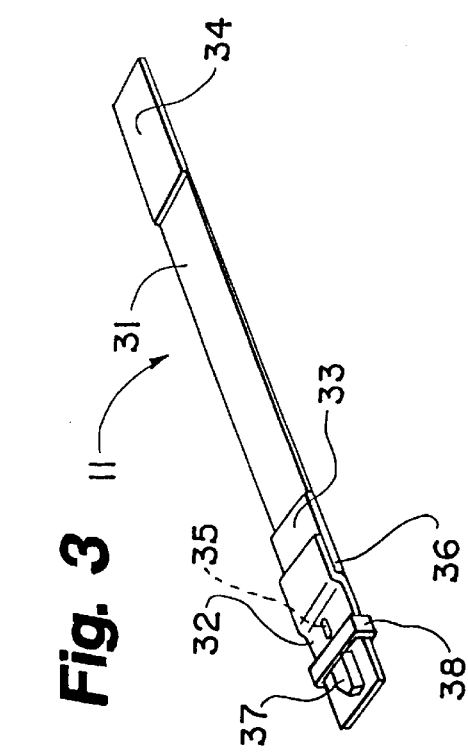
FIG. 3 is an enlarged perspective view of the genestrip of FIG. 1.
Figure 4B:
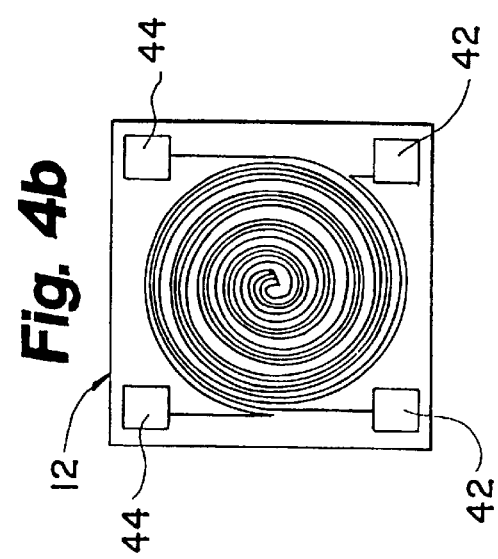
FIG. 4b is a photomicrograph of the heater.

B. Sample Collection Strip 11, as Depicted in FIG. 3:

A critical operation in molecular genetic testing system 10 is specimen procurement (i.e., specimen collection and processing). The system 10 of the present invention employs a novel device, genestrip 11, which uses a chemically treated sample collection pad 32 (paper or synthetic material) onto which samples of biologic materials including blood, tissue samples or other sources of material containing either animal or microbial cells are added. The genestrip 11 is comprised of a flexible plastic support strip 31 onto which is affixed the sample collection pad 32 and the reaction cocktail pouch 33 with attached cocktail fluid tube 35, depicted in phantom in FIG. 3 underlying a portion of the collection pad 32 and fluidly coupling the cocktail pouch 33 and the collection pad 32. The cocktail fluid tube 35 is coupled to an integrated pressure sensitive membrane/valve 36 cocktail pouch 33. Until mechanically actuated, the integrated pressure sensitive membrane/valve 36 prevents the contents of the cocktail pouch 33 from flowing from the cocktail pouch 33 through the cocktail fluid tube 35 to saturate the sample collection pad 32.

Genestrip 11 incorporates the use of FTA™ (U.S. Pat. No. 5,496,552, incorporated herein by reference.) into the sample collection pad 32. FTA is a proprietary solution for the extraction and preservation of nucleic acid on analytic grade paper. FTA paper provides a substantially permanent DNA storage medium that does not permit the growth of bacteria that would contaminate the DNA sample. The FTA paper is used for procurement of genomic DNA from a variety of sources (blood, buccal scraping, cervical swabs). Genestrip 11 is comprised of a thin plastic strip 31 with preferable dimensions of 3.0×0.5×0.1 cm. On one end of strip 31 is affixed the FTA-treated collection pad 32 for DNA specimen collection. Proximal to the collection pad 32 is the reaction cocktail pouch 33, consisting of a sealed plastic reservoir (bag) containing the compilation of buffers, oligonucleotide primers and reaction additives used in the amplification reaction. The cocktail pouch 33 is connected to the collection pad 32 through the tube 35 connected to the heat sealed, pressure sensitive membrane/valve 36 that is interposed between the pouch 33 and the overlying portion of the pad 32. The contents of the cocktail pouch 33 are released when the pressure sensitive membrane/valve 36 is ruptured. The cocktail pouch is ruptured by means of a sliding ferrule 37 affixed to a collar 38. The collar 38 slides over the transport tube 35 and over the cocktail pouch 33 when the Genestrip 11 is inserted into the genetic test card 14. This action pierces the cocktail pouch 33 and squeezes the contents of the cocktail pouch 33 downward through the pressure sensitive membrane/valve 36 and the tube 35. The contents of the cocktail pouch 33 then flow and immerse the FTA treated sample collection pad 32, thereby providing the complete biochemical reaction environment to perform the nucleic acid amplification.

Additionally, the genestrip 11 contains a space at the opposed end thereof dedicated to the placement of test/sample/patient identifier mark 34, which is embodied as a bar code, magnetically encoded data strip or other addressable marking system.

Figure 6A:
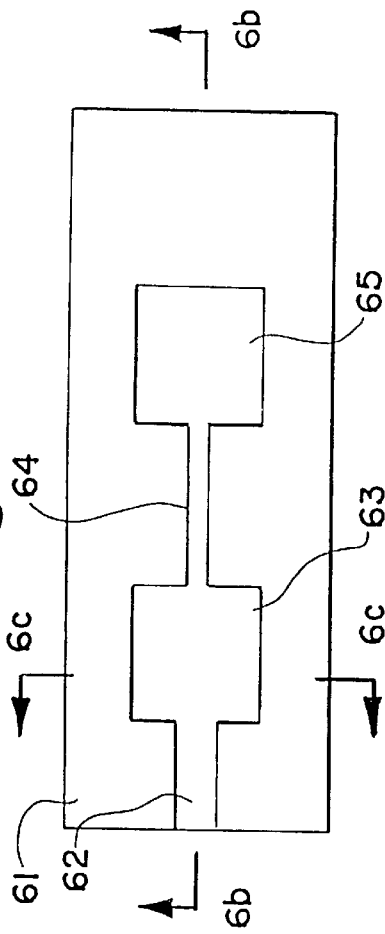
FIG. 6a is a top plan view of the silicon substrate, patterned chambers and capillary interconnects of the genetic test card.
Figure 7D:
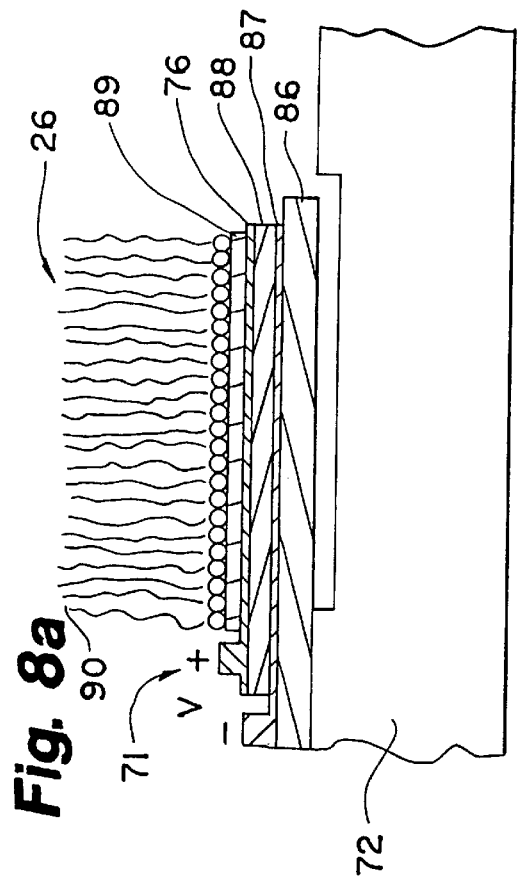

C. How the genestrip 11 Works:

Once a DNA-containing specimen is procured on the FTA-treated sample collection pad 32, (note that such specimens may be stored indefinitely, or processed immediately), processing of the specimen involves external reagent washing of the FTA treated sample collection pad 32. Washing removes all PCR-inhibitory compounds, while the nucleic acid is retained on the FTA treated sample collection pad 32. After processing, the portion of the strip 31 containing the collection pad 32 is inserted into the access port 62 (FIGS. 6a–6c.) of the nucleic acid amplifier chamber 63 of the genetic test card 14. The collar 38 abuts the end of the genetic test card 14 and is mechanically forced into the cocktail pouch 33 to release the cocktail materials contained in the cocktail pouch 33, as detailed above. The strip 11 is inserted such that the collection pad 32 is central to the chamber volume of the nucleic acid amplifier chamber 63. The inserted strip 11 also seals the filled chamber 63 by virtue of the expressed fluid from the cocktail pouch 33 and the sliding ferrule 37, the ferrule being pressed into the external orifice of the access port 62.

D. The Genetic Test Card 14:

Referring to FIGS. 2, 5, and 6a–6c, the genetic test card 14 of the integrated microchip genetic testing system 10 includes a nucleic acid amplification chamber 63. The chamber 63 is defined in part by the assembly of two opposed, spaced-apart microchip heaters 12 (depicted in FIGS. 1, 4a, 4b, and 5). The heaters 12 are bonded to the vertical sidewall 67 of the polymeric interface material 68 and are disposed in the lower surface of the top silicon face wafer 61 and the upper surface of the bottom silicon face wafer 66. Each of the heater chips 12 preferably measures 1 cm square as maximum dimension. The heater chips 12 are fabricated as a component of the top and bottom face wafers 61, 66, respectively, of the genetic test card 14. The closed and sealed chamber 63 accommodates the variable pressures states within the chamber 63 by means of a capillary sized bleed valve 27. Preferably, the bleed valve 27 is fabricated from a thin membrane of polymeric material 27a, created by means of photolithography.

FIG. 1 shows a photomicrograph of the heater chip 12. The heater chip 12 is preferably fabricated from silicon that is metalized with a patterned heater filament 40 and a resistive thermosensing element 42 (see also FIG. 4a). In FIG. 1, the patterned heater filament 40 and a resistive thermosensing element 42 are wound in a spiral shape with the resistive thermosensing element 42 being proximate the patterned heater filament 40. The electrical contact pads 44 are isolated outside of the volume of the reaction chamber 63. The heater chip 12 is electrically insulated with a layer of thermally deposited silicon dioxide 18. The heater chips 12 are also passivated by a coating 19 on the surface of the chip 12 that is exposed to the biochemical reaction in the chamber 63 with a thermostable polymeric material of a prescribed hydrophobic profile, for example the aforementioned OTS.

Figure 4A:
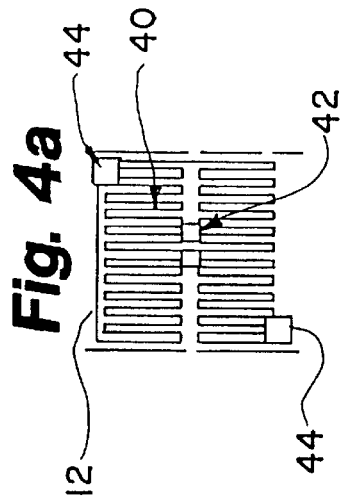
FIG. 4a is a schematic diagram of the heater.
Figure 4C:
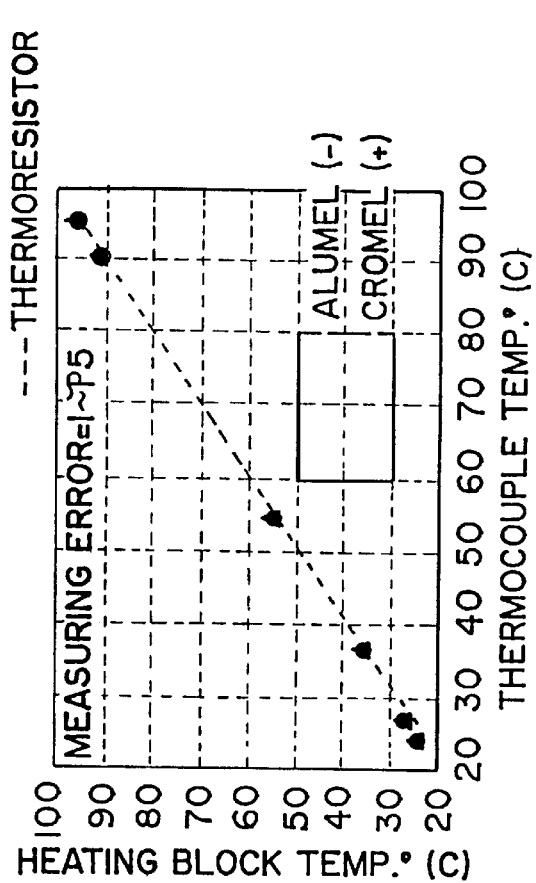
FIG. 4c is a graph depicting relation of the heating block temperature to the thermocouple temperature of the heater.

FIG. 4c depicts the ability of the thermoresister 42 to accurately sense the temperature of the chamber 63 and to provide a feedback to control the patterned heater filament 40 in the chamber 63.

Figure 5:
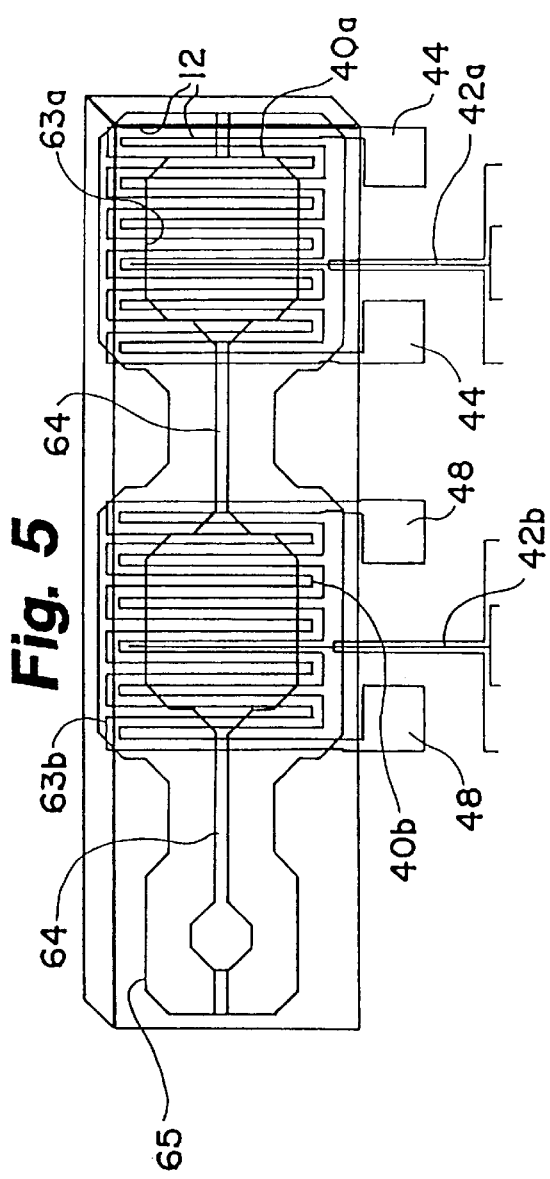
FIG. 5 is a top plan view schematic of an alternate embodiment of the amplification chamber having two heaters disposed thereon.
Figure 4D:
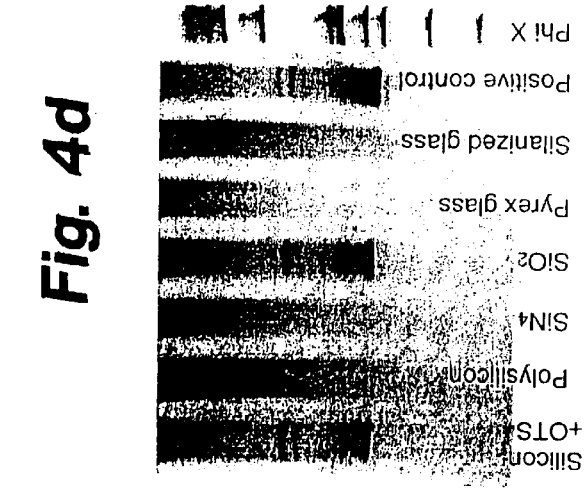
FIG. 4d is the results of a laboratory test by gel electrophoresis of genetic material amplified in the genetic test card of the present invention.

FIG. 5 is an alternate preferred embodiment of the nucleic acid amplification chamber 63. The chamber 63 is bifurcated in two chambers 63a and 63b, fluidly coupled by capillary 64. Each of the chambers 63a and 63b has an independently controlled patterned heater filament 40a, 40b and thermoresister 42a, 42b. By differentially controlling the temperature in the two chambers 63a and 63b so that the temperatures in the two chambers 63a and 63b are different at any given time, the sample material is pumped back and forth between the chambers 63a and 63b, thereby promoting good mixing of the sample material.

Referring to FIG. 2, the nucleic acid reservoir 63, the detection reservoir 65 and the interconnecting transport capillary 64 are fabricated from an epoxy-like material such as SU-8, which is a near UV negative photoresist, and is deposited onto the silicon wafer faces by a spin coated method. The thickness of the SU-8 on each of silicon faces is approximately 500 $\mu$m. Following the deposition of the epoxy negative photoresist, the respective chambers 63, 65 and capillaries 64 of the genetic test card 14 are patterned and resolved by methods of photolithography and organic solvent dissolution of the exposed patterns.

The system 10 employs a capillary transport 64 which connects the nucleic acid amplifier chamber 63 with the detection sensing chamber 65. The capillary 64 preferably measures from 1–2 cm in length, and from 80–200 $\mu$m in width. Underlying the proximal 1 cm of the capillary is a patterned heating filament 66, similar to the heating element 12 associated with the nucleic acid amplifying chamber 63, but electrically isolated and separately addressable by means of electrodes 48 (FIGS. 2 and 5). The transport capillary 64 is designed to create a functional valve through which fluid passing from the amplifier chamber 63 to the detection chamber 65 is controlled. This valving is based on the variable constriction of the capillary width due to the thermal expansion of the sidewalls of the transport capillary 64 structure responsive to the heat generated in the heater 66. The second reservoir within the system defines the detection sensing chamber 65. The detection system used in the present invention is based on the differential response of a microcantilever structure to applied force transduced through a molecular recognition material on the surface of the device. The construction of the microcantilever sensor using MEMS based processing and fabrication has been described previously (U.S. Pat. No. 5,536,963, incorporated herein by reference).

In the present invention, the embodiment of the microcantilever sensor 23 (as depicted in FIGS. 7a–7d) is a series of three individual sensing units 24, 25, and 26. Each of the sensing units 24, 25, and 26 possesses a series of four electrodes; Two electrodes 74 for driving the actuation mode of the device, and two electrodes 75 for the sensing mode. The cantilever beam 71 of the sensing units 24, 25, and 26 preferably has dimensions of approximately 1000 μm length, 200 μm width and total thickness of 2 μm. The microcantilever sensor units 24–26 that comprise the microcantilever sensor 23 are grouped to create a system with an internal reference sensor 24, a relevant negative control sensor 25, and a third sensor 26 dedicated to the detection of a specific and prescribed analyte (test sensing unit 26).

Figure 8A:
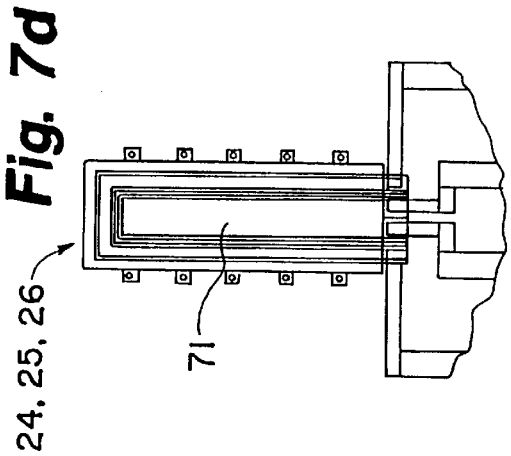
FIG. 8a is a schematic representation of a single microcantilever sensor with the molecular recognition surface prepared for the detection of a single strand of DNA.

Referring to FIG. 8a, the cantilever beam 71 is comprised of silicon nitride 86 on a silicon substrate beam structure 72 and overlaid with a bottom electrode 87 of titanium and platinum, a thin film of PZT 88 and a top electrode 76 of titanium and platinum. The upper surface of the top electrode 76 of test sensing unit 26 is electroplated with elemental gold 89. Actuating polymers 90 are disposed on the elemental gold 89.

Figure 10:
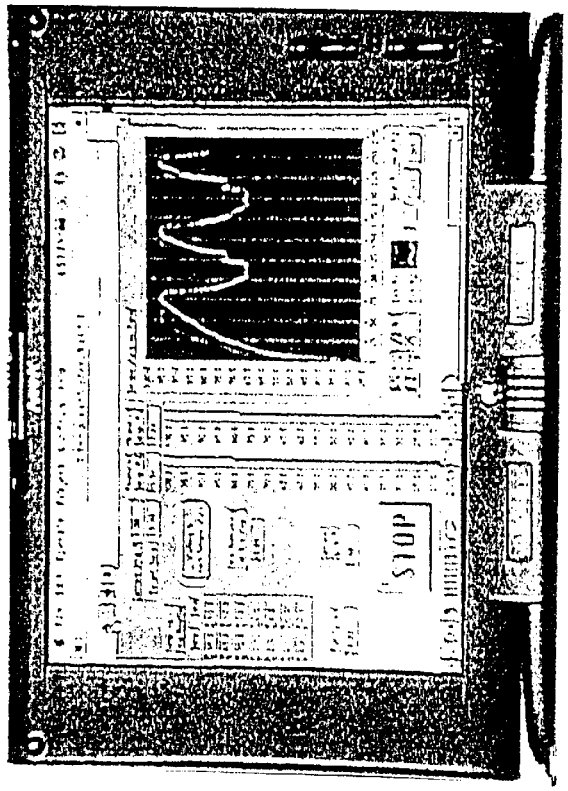
FIG. 10 is a graphic representation of the thermal cycling that occurs in the nucleic acid amplifier chamber of the present invention.

In operation, the temperature in the chamber 63 is cycled to produce the desired amplification of the DNA sample. When the amplification is by the PCR method, the temperature of the chamber 63 is cycled as depicted in FIG. 10, which is an actual readout of the temperature over time in the chamber 63. The DNA helix is unwound at the peak temperature. Amplification occurs at the discontinuity in the rising portion of the temperature cycles.

After amplification, the amplified DNA sample is pumped by the pumps 17 through the transport capillary 64 to the detection sensing chamber 65 to commence a binding event.

The principle of test sensor 26 for detection of DNA and RNA fragments results from the hybridization on the surface of the test sensing unit 26, to immobilized oligonucleotide comprising the actuating polymers 90. In the present invention, the oligonucleotides used as receptors for the amplification product are intercalated or covalently linked to any of a series of organic polymeric thin films. By design these polymeric films, such as polydiacetylene, undergo a change in their structural confirmation consequent to the binding of DNA fragments to their cognate receptors. A novel application of actuating polymers 90 is their role in stress transduction, both due to the absolute mass or as a function of the resonant frequency of oscillation of the beam 71. In this invention is described the novel application of the piezoelectric or pyroelectric thin films affixed to the beam microstructure 71 and the mechanical electrical transducer.

Figure 8B:
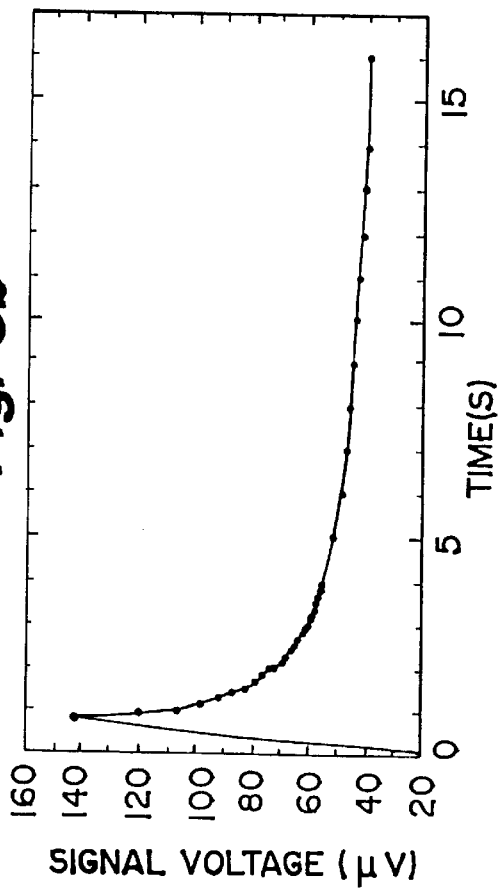

The voltage characteristic is depicted in FIG. 8b. At time=0, the there is zero signal voltage. The signal voltage rises to a sharp peak at the occurrence of a binding event and then gradually declines over time after the binding event. In this case, when sufficient force is applied to the piezoelectric/pyroelectric crystal of the beam 71, a proportional voltage is created across its length, with an associated flow of charge through the electrodes. The present invention employs a charge amplifier circuit 28 (FIG. 2) incorporating a band pass filter for reduction of associated electrical noise. In its intended operation, the cantilever sensing unit 26 is exposed to fluid delivered from the connecting transport capillary 64 containing a concentration of the product from the amplification reaction in chamber 63. In a specific embodiment of the system 10, oligonucleotides complementary to the nucleic acid sequence of interest is affixed to the actuating polymer 90 on the biomolecular recognition surface of the cantilever sensing unit 26.

Figure 8C:
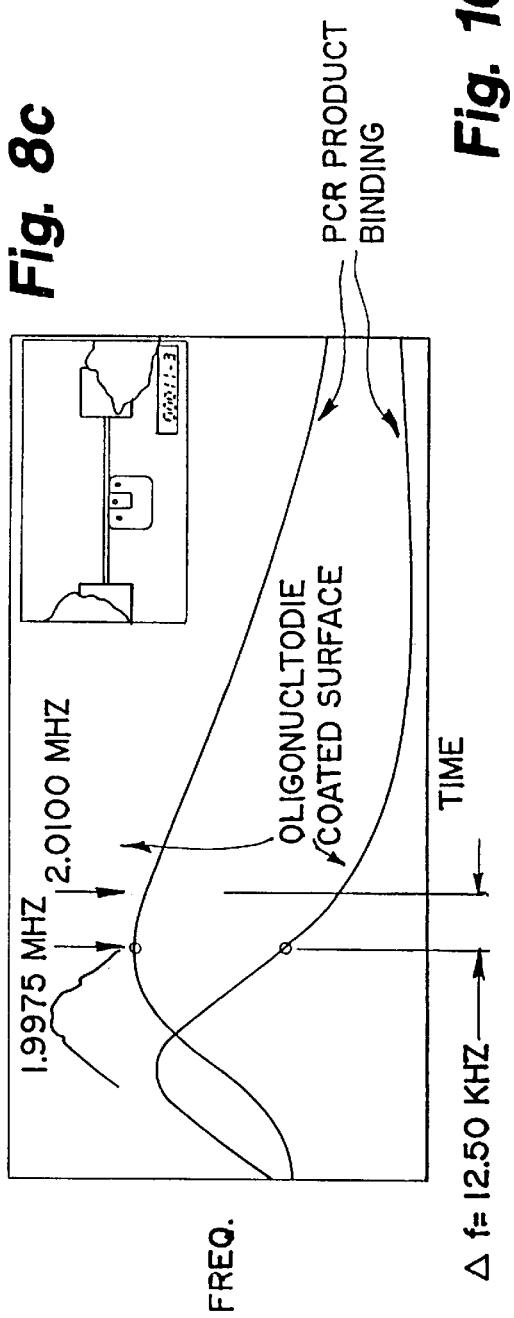

Upon hybridization, a strong contraction of the thin film polymer 90 occurs, resulting in the transduction of mechanical stress to the underlying piezoelectric PZT-on-$Si_3N_4$ cantilever 71. The spontaneous charge produced by piezoelectric element of the cantilever 71 is detected and amplified before transmission of the output to the interpretive software interfaced with the sensor through a high speed data acquisition circuit. The voltage output upon hybridization is depicted in FIG. 8b. FIG. 8c depicts the frequency shift downward in the resonant frequency of the beam 71 due to the binding. Based on this description this application of the microcantilever based sensor offers superior sensitivity, specificity and utility in an integrated MEMS system format

What is claimed is:

1. A genestrip comprising:

a support strip;

a reaction cocktail pouch affixed to the support strip and coupled to a sample collection pad by a cocktail fluid tube capped by a pressure sensitive membrane; and an assembly mounted on the support strip, the assembly is operable for sliding and rupturing the reaction cocktail pouch containing a fluid and forcing the fluid into the cocktail fluid tube.

2. The genestrip of claim 1, wherein the support strip is operable for coupling to an integrated nucleic amplifier and detector.

3. The genestrip of claim 1, wherein the support strip is a flexible plastic support strip.

4. The genestrip of claim 3, wherein the flexible plastic support strip includes an area for receiving a sample identifier mark.

5. The genestrip of claim 1, wherein the sample collection pad is fabricated from paper.

6. The genestrip of claim 1, wherein the sample collection pad is fabricated from a synthetic material.

7. The genestrip of claim 1, wherein the sample collection pad is impregnated with FTA™.

8. The genestrip of claim 1, wherein the reaction cocktail pouch is a sealed reservoir.

9. The genestrip of claim 8, wherein the sealed reservoir is fabricated from a plastic.

10. The genestrip of claim 1, wherein the reaction cocktail pouch contains buffers, oligonucleotide primers and reaction additives used in an amplification reaction.

11. The genestrip of claim 1, wherein the membrane is a pressure sensitive valve.

12. The genestrip of claim 1, wherein the assembly comprises:

a sliding ferrule affixed to a collar.

13. The genestrip of claim 1, wherein the support strip has an area for receiving a sample identifier mark.

14. A method comprising:

inserting a genestrip including a cocktail pouch and a sample collection pad into a genetic test card;

rupturing the cocktail pouch containing a fluid and forcing the fluid into contact with the sample collection pad including a nucleic acid; and amplifying the nucleic acid to form amplified nucleic acid.

15. The method of claim 14, wherein rupturing the cocktail pouch containing a fluid and forcing the fluid into contact with a sample collection pad including a nucleic acid comprises:

moving a sliding assembly along the genestrip to rupture the cocktail pouch containing the fluid and to force the fluid through a cocktail fluid tube and into contact with a sample collection pad.

* * * * *